April 17, 1951     C. S. ASH     2,548,929
VEHICLE WHEEL
Filed July 13, 1946     2 Sheets-Sheet 1
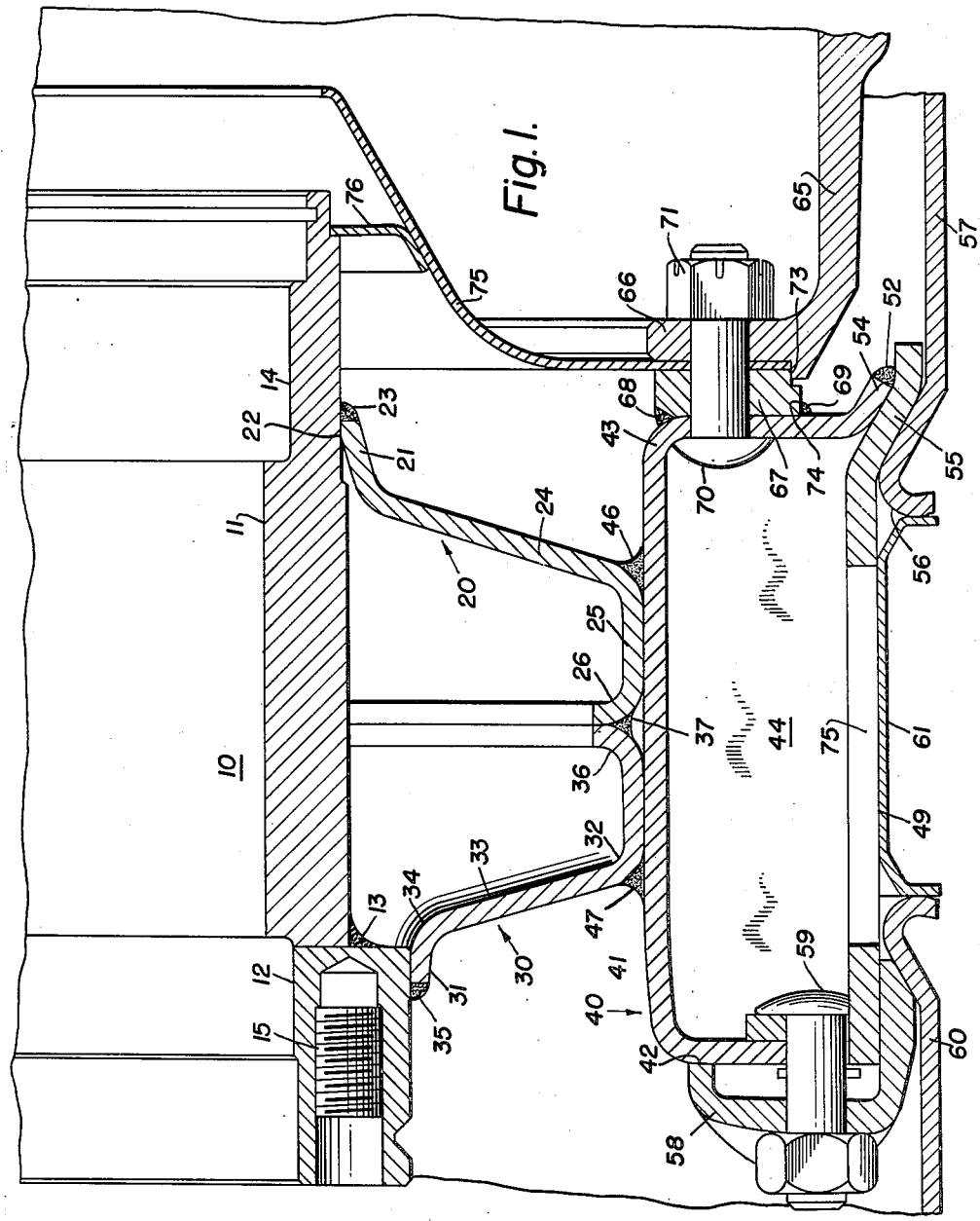
INVENTOR.
CHARLES S. ASH
BY Morgan, Finnegan and Durham
ATTORNEYS April 17, 1951 C. S. ASH 2,548,929
VEHICLE WHEEL
Filed July 13, 1946 2 Sheets-Sheet 2
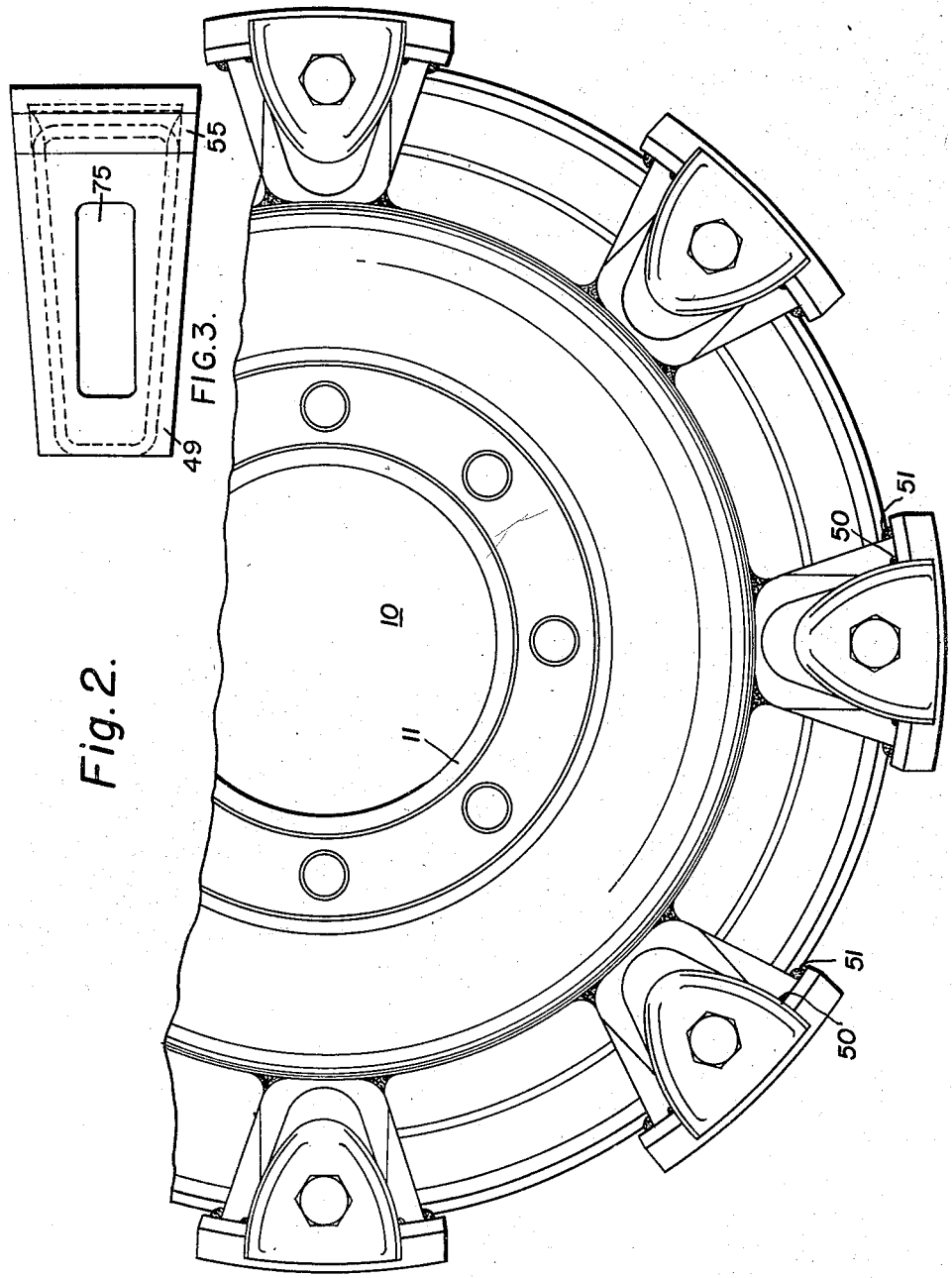
INVENTOR.
CHARLES S. ASH
BY Morgan, Finnegan and Durham
ATTORNEYS Patented Apr. 17, 1951

2,548,929

UNITED STATES PATENT OFFICE 2,548,929

VEHICLE WHEEL

Charles S. Ash, Milford, Mich.

Application July 13, 1946, Serial No. 683,485

6 Claims. (Cl. 301—13)

The present invention relates to vehicle wheels, and more particularly to such wheels for mounting a pair of road engaging elements and including braking means for the wheel.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Figure 1 is a fragmentary vertical cross-sectional view taken through a spoke of a typical and illustrative embodiment of the present invention;

Figure 2 is a fragmentary side elevation of the wheel shown in Figure 1 viewed from the outer side of the wheel inwardly; and Figure 3 is a top plan view of one of the spoke members of the wheel shown in Figures 1 and 2.

It is an object of the present invention to provide an improved vehicle wheel of a type adapted to demountably receive a pair of pneumatic tire rims, the wheel being provided with braking means. The invention provides a vehicle wheel of the type just mentioned which is sturdy enough for the heaviest duty, such as is usually required of dual tired wheels, and is at the same time extremely economical to fabricate from the point of view of both labor and materials. Another object of the invention is the provision of an economical fabricated vehicle wheel with adequate braking means.

Referring now in detail to the illustrative embodiment of the invention shown by way of example in the accompanying drawings, the vehicle wheel is provided with a tubular hub element indicated generally by the reference numeral 10. The hub may, if desired, be fabricated of two substantially cylindrical portions as best shown in Figure 1 of the drawings, there being provided an elongated axially inner portion 11 and an outer shorter cylindrical portion 12. The hub portion 12 is of somewhat thicker construction than hub portion 11, is of greater internal and external diameter, and is welded to the outer end of portion 11 by means of a circular weld 13. Finished internal seats 14 and 15 are provided in the hub element for the reception of suitable anti-friction bearings whereby the wheel may be mounted for rotation upon the end of a vehicle axle.

The central body portion of the vehicle wheel of the present invention is formed of a pair of radially extending web members secured to the hub 10 in axially spaced apart relationship and having outer peripheral portions which are turned toward each other and joined. As best shown in Figure 1, the inner web member 20 is preferably pressed or drawn from a single blank of material and is formed with a short substantially cylindrical portion 21 at its inner periphery which is press fitted in assembling the wheel on a finished external surface 22 towards the axially inner end of hub element 10. The inner web and the hub are securely joined by means of a circular weld 23 at the inner end of cylindrical portion 21. Radially outwardly of its portion 21 the inner web 20 extends in a frusto-conical central portion 24 which is abruptly axially outwardly turned at its outer periphery to provide an integral cylindrical portion 25 of the web. Cylindrical portion 25 is further turned at its axially outer end in a short inwardly radially extending portion 26.

The outer web 30 of the composite wheel structure is preferably pressed or drawn from a single blank of material similarly to the inner web and is likewise formed with a short cylindrical portion 31 at its inner periphery and with a relatively long cylindrical portion 32 at its outer periphery, a central portion 33 being formed frusto-concially and extending between the cylindrical portions mentioned. The inner cylindrical portion 31 is press fitted on the finished outer surface 34 of the axially outer hub portion 12 and is securely welded thereto by a circular weld 35. The axially outer cylindrical portion 32 of outer web 30 is formed at its axially inner end in an inwardly radially extending turned portion 36 which is adapted to abut turned portion 26 of the inner web 20 centrally of the length of the hub 10. The inner and outer webs are securely joined together at these abutting portions by a strong circular weld 37.

With the construction for the wheel thus far shown and described it will be apparent that a strong and economical composite hub and central body portion has been provided for the wheel, the inner and outer web members being simply formed and securely welded to the hub element adjacent the opposite ends thereof, and the webs extending frusto-conically toward each other and mutually reinforcing one another by abutting at the ends of their peripheral cylindrical portions about the central portion of the hub, and being securely welded thereat.

Means are provided for demountably mounting a pair of conventional pneumatic tire rims on the wheel, and as embodied comprise a plurality of radially and axially extending boxlike spoke members mounted on the cylindrical exterior of the central body portion of the wheel provided by the cylindrical portions 25 and 32 of the inner and outer webs. Each spoke member, indicated generally by the reference numeral 40, is preferably formed of a single blank of material drawn into the desired shape. As embodied the spoke members are formed as rectangular, wedge shaped boxes each member having an axially extending bottom wall 41, a radially extending front or axially outer wall 42, a radially extending rear or axially inner wall 43, and side walls 44 joining the bottom and front and rear walls. The spoke members 40 are disposed in circumferentially spaced apart relationship about the axially extending cylindrical surfaces provided by portions 25 and 32 of the web members and are securely joined thereto by means of segmental arcuate welds 46 and 47 between the bottom wall 41 of each spoke and the webs 20 and 30 respectively.

Radially outer surfaces for removably mounting a pair of tire rims on the wheel are provided by wedge shaped plate members 49, one of which is positioned over the end of each spoke member 40 and is supported by the side, front and rear walls of the spoke. The top plates 49 are welded to the side walls 44 and rear walls 43 of the spokes by means of welding indicated at 50, 51 and 52. The rear walls 43 of the spoke members are provided with axially inwardly turned or inclined radially outer ends 54, and the axially inner ends of plate members 49 are formed in correspondingly inclined portions 55 which seat on portions 54. The radially outer surfaces of inclined portions 55 provide seats to receive the turned edge or bead 56 of an inner pneumatic tire rim 57 to be mounted on the wheel.

The outer end walls 42 of spoke members 49 provide external plane surfaces to receive the lower prongs of conventional rim mounting lugs 58 which are adapted to be held in place by means of lug bolts 59 extending through suitable apertures in the end walls. The lugs 58 provide inclined mounting surfaces to receive the turned edge or bead of an outer pneumatic tire rim 60 which is a duplicate of inner rim 57, and a standard annular spacing ring 61 is provided between the rims to cooperate with the lugs and inclined portions 55 for demountably positioning the rims in place on the wheel.

Braking means are provided for the wheel at the inner side thereof, and, as illustratively shown, comprise the cylindrical brake drum 65 having at its axially outer end a short, inwardly radially extending mounting flange 66. In order to mount the drum 65 on the wheel there are provided a plurality of mounting blocks 67 one of which is secured to the inner plane surface of the rear wall 43 of each spoke member 40, the blocks being securely joined to the spoke by means of welding as indicated at 68 and 69. Suitable apertures are provided through each spoke rear wall 43 and mounting block 67 to receive a drum mounting bolt 70 which passes through flange 66. Nuts 71 and bolts 70 securely position the drum 65 in place on the wheel and allow easy removal when desired.

The drum mounting flange 66 is preferably provided with an axially outer extension 73 having a radially inner face to seat on cooperating faces 74 provided on the mounting blocks 67 so that drum 65 may be easily and accurately positioned on the wheel and cooperating driving surfaces are provided. Each top plate 49 is preferably apertured as indicated at 75 in order to allow access within the hollow spoke members 40 to reach the lug and drum mounting bolts 59 and 70 respectively.

In order to protect the interior of brake drum and the hub bearings from harmful moisture and dirt the wheel is preferably provided with a frusto-conical deflecting plate 75 which is secured at its plane outer periphery between brake drum flange 66 and blocks 67 by means of bolts 70, and extends beyond the end of hub 10. A second plate 76 is secured to the end of the hub and to the plate 75, and effectively seals off the inner hub bearing and brake mechanism from external harmful substances which might enter between spokes 40.

In the wheel construction as shown and described it will be apparent that there has been provided a sturdy, durable and safe structure adapted to receive dual tires and be used for heavy loads. The wheel is simply and economically formed of pressed or drawn webs and spokes combined with a tubular hub, and a brake drum is removably secured to the sturdy spoke construction, adequate drum ventilation being afforded between the spokes directly to the drum.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a hub element, a pair of web members secured to the hub element in spaced apart relationship at least one of said members being turned toward and joined to the other at the outer peripheries of said members providing an axially extending circumferential surface, hollow box-like radially and axially extending spoke members secured to said circumferential surface having radially outer surfaces for mounting a pair of tire rims, and braking means secured to said spoke members.

2. A vehicle wheel comprising, in combination, a hub element, a pair of pressed web members secured to the hub element in spaced apart relationship, said members having cylindrical portions at their outer peripheries extending toward each other and joined, separately formed, hollow radially and axially extending spoke members circumferentially spaced apart and secured to said cylindrical portions said spoke members having axially spaced radially outer surfaces for mounting a pair of tire rims, and a brake drum secured to the axially inner ends of said spoke members.

3. A vehicle wheel comprising, in combination, a hub element, a pair of web members secured to the hub element in spaced apart relationship at least one of said members being turned toward and joined to the other at the outer peripheries of said members providing an axially extending circumferential surface, radially and axially extending box-like spoke members each having a bottom wall secured to said surface, a top wall having radially outer surfaces for mounting a pair of tire rims, and an inner end wall, and a brake drum having a mounting flange secured to said spoke member inner end walls.

4. A vehicle wheel comprising, in combination, a hub element, a pair of web members secured to the hub element in spaced apart relationship at least one of said members being turned toward and joined to the other at the outer peripheries of said members providing an axially extending circumferential surface, radially and axially extending box-like spoke members each having a bottom wall secured to said surface, a top wall having radially outer surfaces for mounting a pair of tire rims, and an inner end wall, a mounting block element secured to the axially inner surface of each said spoke member inner end wall, and a brake drum having a mounting flange secured to said mounting blocks.

5. A vehicle wheel comprising, in combination, a hub element, a pair of web members secured to the hub element in spaced apart relationship having cylindrical outer peripheral portions extending toward each other and joined substantially centrally of the length of said hub element, radially and axially extending box-like spoke members each having a bottom wall secured to said cylindrical portions and a radially extending inner end wall, a brake drum bolted to said inner end walls, and a plurality of apertured plates one over the top of each said spoke member said plates having radially outer surfaces for mounting a pair of tire rims.

6. A vehicle wheel comprising, in combination, a hub element, a pair of web members secured to the hub element in spaced apart relationship having cylindrical outer peripheral portions extending toward each other and joined, radially and axially extending box-like spoke members each having a bottom wall secured to said cylindrical portions, a radially extending axially outer end wall apertured to receive a lug bolt and a radially extending axially inner end wall apertured to receive a brake drum mounting bolt, a brake drum bolted to said inner end walls, and a plurality of apertured plates one over the top of each said spoke member said plates having radially outer surfaces for mounting a pair of tire rims.

CHARLES S. ASH.

REFERENCES CITED

The following references are of record in the file of this patent:

UNITED STATES PATENTS

| Number | Name | Date |
|---|---|---|
| 1,952,075 | Keller | Mar. 27, 1934 |
| 2,084,637 | Burger | Oct. 5, 1937 |
| 2,158,709 | Trumble | May 16, 1939 |
| 2,397,719 | Ash | Apr. 2, 1946 |

FOREIGN PATENTS

| Number | Country | Date |
|---|---|---|
| 545,776 | France | 1922 |